United States Patent [19]
Tamaru et al.

[11] Patent Number: 4,723,056
[45] Date of Patent: Feb. 2, 1988

[54] COORDINATE POSITION DIGITIZING SYSTEM

[75] Inventors: Hideshi Tamaru; Kimiyoshi Yoshida, both of Kanagawa; Hiroshi Benno, Chiba; Kaoru Tomono, Kanagawa; Akio Sakano, Ibaragi, all of Japan

[73] Assignee: Sony Corporation, Tokyo, Japan

[21] Appl. No.: 835,727

[22] Filed: Mar. 3, 1986

[30] Foreign Application Priority Data

Mar. 4, 1985 [JP] Japan .................. 60-42517

[51] Int. Cl.$^4$ .......................... G08C 21/00
[52] U.S. Cl. .............................. 178/19
[58] Field of Search ............ 178/18, 19; 324/208; 361/188

[56] References Cited
U.S. PATENT DOCUMENTS 4,571,454 2/1986 Tamaru et al. ............ 178/18

Primary Examiner—Stafford D. Schreyer

[57] ABSTRACT

A coordinate position digitizing system incorporates apparatus for detecting the X and Y positions of a voltage detecting device relative to a position determining plate employing apparatus for generating data corresponding to the X and Y positions of said voltage detecting device on said plate at successive sampling times, means for calculating the difference corresponding to the difference in the indicated position at two successive sampling periods, and rejecting signals indicating positions which differ from previous positions by distances which are greater than a predetermined amount, corresponding to the maximum distance that the voltage detecting device can be moved between successive sampling periods. In this way, position-indicating signals which are corrupted by noise pulses or the like are rejected.

6 Claims, 10 Drawing Figures

COORDINATE POSITION DIGITIZING SYSTEM

BACKGROUND

1. Field of the Invention

The present invention relates to a coordinate position digitizing system and more particularly to such a system suitable for use in a diagram making system incorporating a tablet plate and a stylus, the position of the stylus on the tablet plate being detected to provide data for drawing lines and symbols.

2. Prior Art

In a diagram display system, a diagram or the like is drawn on a tablet plate with a stylus, to produce data for display on a display system. The input system comprises a tablet plate and a stylus, forming a coordinate position digitizing system, in which the position of the stylus, on the tablet plate, is detected as successive positions of the stylus.

Such a coordinate position digitizing system includes a plate or tablet, a stylus, apparatus for detecting the position of the stylus on the plate or tablet, and a drive circuit for supplying a voltage or current required for the tablet or plate, as well as a signal processing circuit for processing a signal obtained from the input system.

It is proposed to employ electrostatic means for detecting the position of the stylus on the tablet. Such an arrangment is illustrated in FIGS. 1 and 2 of the drawings, where a position determining plate 10 (forming a tablet plate) comprises a plurality of strip conductors $Y1, Y2 \ldots Ym$, arranged on a first insulating layer 11, and extending parallel to each other at regularly spaced intervals. A plurality of strip conductors $X1, X2 \ldots Xn$ are arranged on a second insulating layer 12 covering the surface of the first insulating layer 11, extending parallel to one another at regularly spaced intervals, such intervals being the same as the interval for the conductors $Y1, Y2 \ldots Ym$ in the direction perpendicular to the conductors $Y1, Y2 \ldots Ym$. A third insulating layer 13 covers the surface of the second insulating layer 12. On this layer 13, the position determining plate 10 is provided, and a stylus including the detecting electrode 31 is placed on this layer 13. The strip conductors $X1, X2 \ldots Xn$ of the position determining plate 10 have switches $22_1, 22_2 \ldots 22_n$ provided at the ends thereof, and which switches constitute a switch circuit 22 which forms a driving circuit section for cooperation with a shift register 24. The strip conductors $Y1, Y2 \ldots Ym$ have switches $23_1, 23_2 \ldots 23_m$ at one end thereof which constitute a switch circuit 23 forming a driving circuit section for a shift register 25. The switches of the switch circuits 22 and 23 are grounded at terminals A, and are connected to a common voltage supply terminal 21 via terminals B.

During a unit detecting period, the switches $22_1, 22_2 \ldots 22_n$ of the switch circuit 22 are supplied successively with equal length pulses, from the output terminals $N1, N2 \ldots Nn$, in order to toggle the switches for connection of the strip conductors to the voltage terminal B instead of the grounded terminal A. Thus the strip conductors $X1, X2 \ldots Xn$ are supplied successively with the voltage Vcc present at the voltage supply terminal 21. During another unit detecting period, the switches $23_1, 23_2 \ldots 23_m$ of the switch circuit 23 are supplied successively with pulse signals of equal width from the output terminals $M1, M2 \ldots Mm$, to toggle the switches for connection to the terminal B instead of the terminal A. Thus, the strip conductors $Y1, Y2 \ldots Ym$ are supplied successively with the voltage Vcc present at the voltage supply terminal 21.

If the spacing between center lines of adjacent strip conductors $X1, X2 \ldots Xn$ and the strip conductors $Y1, Y2 \ldots Ym$ is represented by Lp, then the strips of the plate are scanned at a scanning speed $Ss = Lp/Ts$ in the X direction, and in the Y direction.

When the detecting electrode 31 of the stylus (FIG. 1) is placed on the position determining plate 10, it generates an output voltage Vo, which varies for successive short periods Ts as shown in FIG. 8A, as a result of the electrostatic capacity formed between the strip conductors supplied with the voltage Vcc on the detection electrode 31. The output voltage Vo takes a maximum value Vm when the voltage Vcc is applied to the strip conductor of the X or Y group which is closest to the position of the detecting electrode 31. In practice, the voltage Vo takes stepwise varying values as illustrated in FIG. 8, only when the voltage Vcc is applied to a strip conductor near to the location of the detecting electrode 31, and the output voltage is substantially zero when the voltage Vcc is applied to a strip conductor positioned far from the location of the detecting electrode 31.

The X and Y positions of the detecting electrode 31 on the position determining plate 10 may be derived from the output voltage Vo. Specifically, the output voltage Vo is supplied to a tuning circuit amplifier which provides an output signal Sb of a predetermined frequency with a maximum amplitude at a time delayed by an instant after the time in which the voltage Vo takes its maximum level, as illustrated in FIG. 8B. The signal Sb is supplied to a Schmitt trigger circuit, and a signal Sz is derived therefrom, which signal falls from a high to a low level at the instant at which the signal Sb crosses a predetermined level Vs, corresponding to the threshold level of the Schmitt trigger. The output Sz rises from a low to a high level at the instant at which the signal Sb crosses ground potential, corresponding to the negative-going Schmitt threshold level, as illustrated in FIG. 8C.

The time period Td (FIG. 8C) extends from the instant t1 in which the voltage Vo is first supplied to one of the strip conductors $X1, X2 \ldots Xn$ or $Y1, Y2 \ldots Ym$, until the instant t2 in which the signal Sz falls below ground level after having crossed above level Vs, corresponding to the time required for scanning from one end of the plate 10 to the position of the detecting electrode 31 at the scanning speed referred to above, in the X or Y direction, respectively. Thus the time interval Td corresponds to the distance from one end of the position determining plate 10 to the position of the detecting electrode 31. The time interval Td is detected by counting clock pulses having a pulse repetition rate substantially shorter than the short period Ts, using a counter, beginning with the instant t1 up until the instant t2. The content of the counter at the instant t2 is provided as an output corresponding to the position of the detecting electrode 31, on the position determining plate 10, in the X or Y direction, respectively, thus producing coordinate data for the detecting electrode 31 on the position determining plate 10.

In the arrangement described above, when the detecting electrode 31 of the stylus is moved on the position determining plate 10, in drawing a diagram or the like, a static electric charge may be generated from the sliding of the detecting electrode 31 on the insulating layer 13 which forms the upper surface of the position determining plate 10. This static charge may be loaded on the insulating layer 13, or, a static charge may be generated from the sliding of the clothing or the like of the operator moving the stylus on the insulating layer 13 so as to be loaded on the insulating layer 13. Such a static charge may be discharged through the detecting electrode 31. This causes a noise signal to be induced at the output of the detecting electrode 31, which may result in erroneous operation. Noise can also be produced in the output circuit, through induction, as a result of nearby electrical apparatus, or from the proximity of a human body to the detecting electrode 31.

When noise is present in the output of the detecting electrode 31, the normal voltage Vo as described above cannot be obtained and the true voltage level may be obscured by noise. For this reason, the time from the instant at which the voltage Vcc is first supplied to a strip conductor X1 or Y1, at one end of the position determining plate 10, to the time of rising or falling of the signal Sz, may not correspond to the distance from the end of a position determining plate to the position of the detecting electrode 31. In this event, the accurate detection of the position of the electrode 31 cannot be obtained. Thus erroneous coordinate data is produced for the position of the detecting electrode 31.

It is desirable to provide an apparatus and method which can generate digital data corresponding to coordinate position when a plurality of strip conductors are supplied successively with a given voltage, the voltage of each strip conductor being detected by detecting means which provides a detected output for corresponding coordinate data corresponding to the position of the voltage detecting means on the position determining plate, whereby a positional detection output is generated depending on such coordinate data, while eliminating the effect of erroneous coordinate data generated due to noise components, so that a correct position detection output is developed.

SUMMARY OF THE PRESENT INVENTION

It is a principal object of the present invention to provide a system for accomplishing the above aims.

In one embodiment of the present invention, there is provided a position determining plate having a plurality of strip conductors arranged in parallel fashion at regularly spaced intervals, a driving section for supplying a predetermined voltage successively to the plurality of strip conductors, a voltage detecting device for producing a detection output corresponding to the position of one of such strip conductors when the voltage detecting device is placed on the position determining plate, signal extraction means for extracting a signal component of a predetermined frequency from the detected output of the voltage detecting means, a data producing section for generating data depending on the time measured from a reference instant associated with the supply of voltage to a plurality of strip conductors, to an instant at which the output signal from the signal extracting means reaches a predetermined level or a later instant at which the output signal crosses over a specific level, and a data processing section which provides coordinate data for the position of the voltage detecting device on the position determining plate in response to the data derived from the data producing section, to deliver a positional detection output depending on such coordinate data. The data processing section includes data intake means for successively taking in the data derived from the data generating section as the coordinate data, and coordinate difference calculating means for determining the absolute data of the difference between two values indicated by first and second detected data coordinates, along with coordinate data selecting means for selecting at least one of the first and second coordinate data to be effective as coordinate data for determining the position of the voltage detecting means on the position determining plate, when the absolute value obtained from the coordinate difference calculating means is less than a predetermined reference value, depending on the maximum moving distance of the voltage detecting means as it moves the position determining plate within a period corresponding to a detecting cycle in which the first and second coordinate data are sampled.

In the use of the present invention, the data produced by the data producing section, for each unit period of detection, are successively taken in as coordinate data by the data intake means, while the absolute value of the difference between two values indicated by the first and second coordinate data successfully taken in is calculated in the coordinate difference calculating means. The first and second coordinate data should correspond to the positions of the voltage detecting means on the position determining plate during the two successive position detections, respectively.

The speed of movement of the voltage detecting means on the position determining plate is limited. Therefore the time interval between two successive positional detections corresponding to the maximum distance which the voltage detecting means can move on the position determining plate within a single detecting cycle, is set at a limited value. The distance between the positions of the voltage detecting means on the position determining plate during two successive detections is within this maximum moving distance. Accordingly, when both of the first and second coordinate data are correct, corresponding respectively to the positions of the voltage detecting means on the position determining plate at two successive detections, an absolute value calculated by the coordinate difference calculating means must be less than the value corresponding to the maximum moving distance of the voltage detecting means. The absolute value calculated in the coordinate difference calculating means is compared with the reference value, depending on the maximum moving distance of the voltage detecting means within the period corresponding to the detecting cycle. Only when the absolute value is less than the reference value is the detected coordinate data accepted as coordinate data for the position of the voltage detecting means on the position determining plate. Then a positional detection output, depending on the coordinate data, is permitted to be effective and is developed as an output.

In the use of the present invention, when a noise component is incorporated into the detecting output from the voltage detecting means, and when erroneous data is supplied from the data producing section due to such noise component, most of the erroneous coordinate data are eliminated without becoming effective to produce output signals for developing the position detection output. Therefore, the probability of the erroneous positional detection output being delivered from the data processing section is drastically reduced.

BRIEF DESCRIPTION OF THE DRAWINGS

Reference will now be made to the accompanying drawings in which.

DESCRIPTION OF THE PREFERRED EMBODIMENTS

Figure 3:
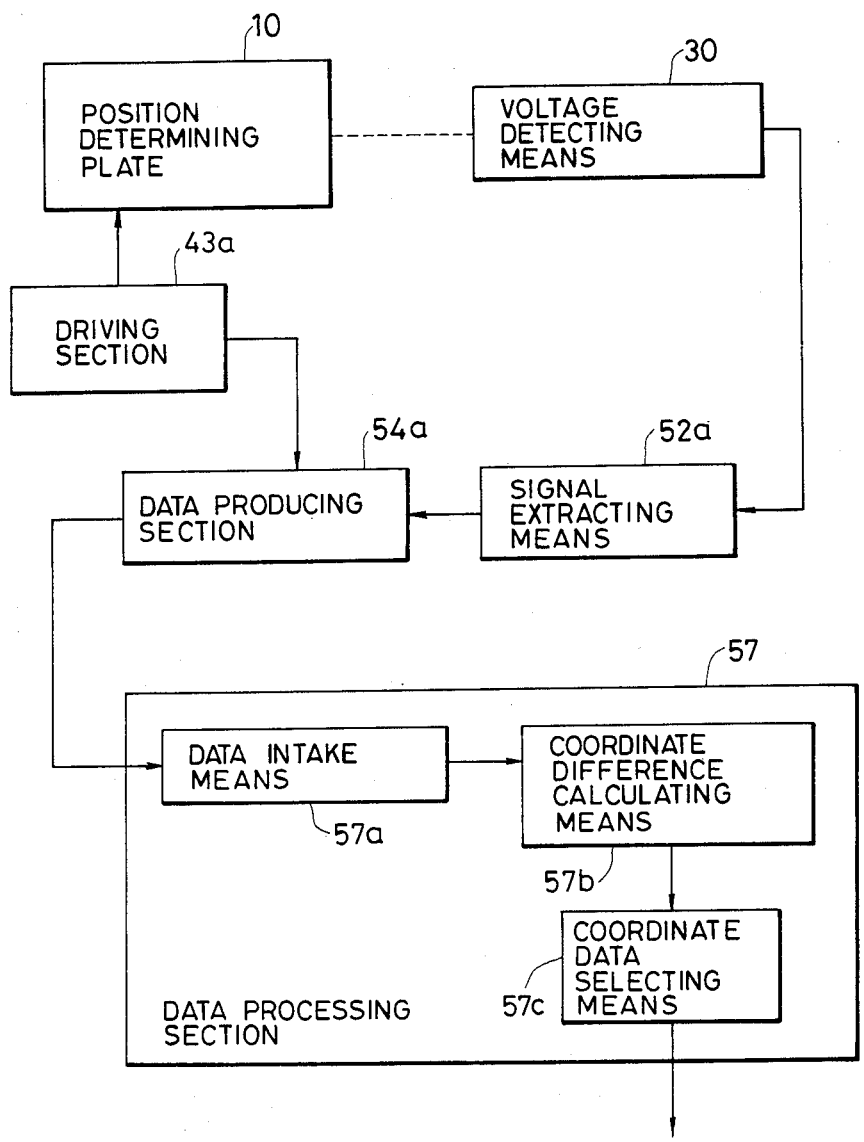
FIG. 3 is a block diagram illustrating the basic arrangement of a coordinate position digitizing system in accordance with the present invention.

FIG. 3 illustrates a functional block diagram of a system incorporating the invention. The position determining plate 10 and the voltage detecting unit have the operations and functions described above. The driving section 43a supplies clock pulses, etc., via the shift registers 24 and 25 to the lines and columns of the plate 10.

The signal extracting unit 52a obtains rectangular pulses from the voltage detecting unit, and the data producing section 54a converts the pulses into position-designating signals.

The data intake unit 57c of the data processing section 57 gets the data from the unit 54a and the unit 57a calculates differences between successive X and Y positions as reported by the unit 54a. The unit 57c operates to produce an output corresponding to verified position-indicating data, after processing to eliminate the effects of noise etc. on the position data.

Figure 4:
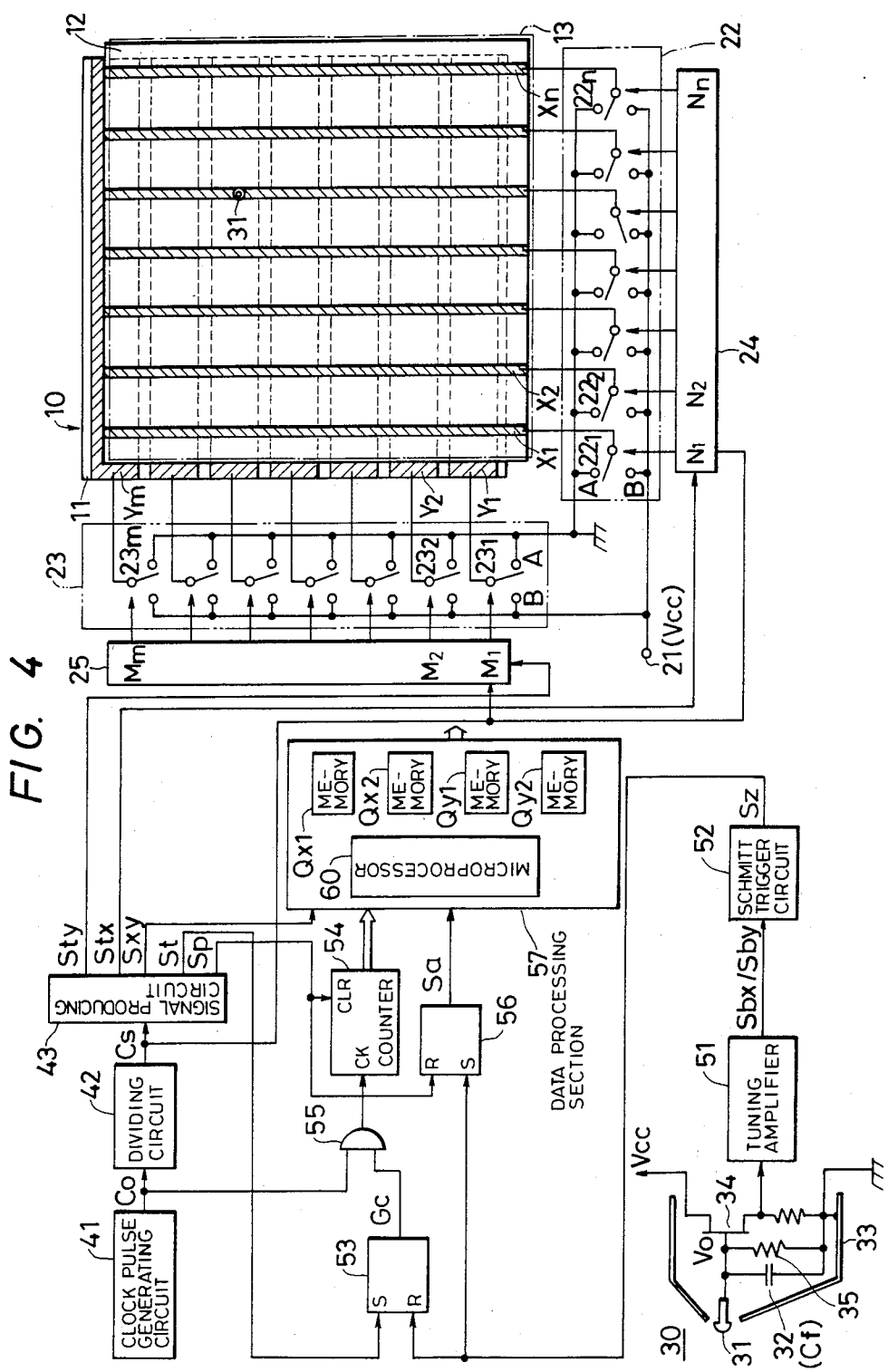
FIG. 4 is a schematic diagram illustrating one embodiment of a coordinate position digitizing system in accordance with the present invention.

FIG. 4 illustrates one embodiment of a coordinate position digitizing system in accordance with the present invention. In the system of FIG. 4, the same references are used to designate elements and parts corresponding to those of FIG. 1, which has been described above.

Figure 1:
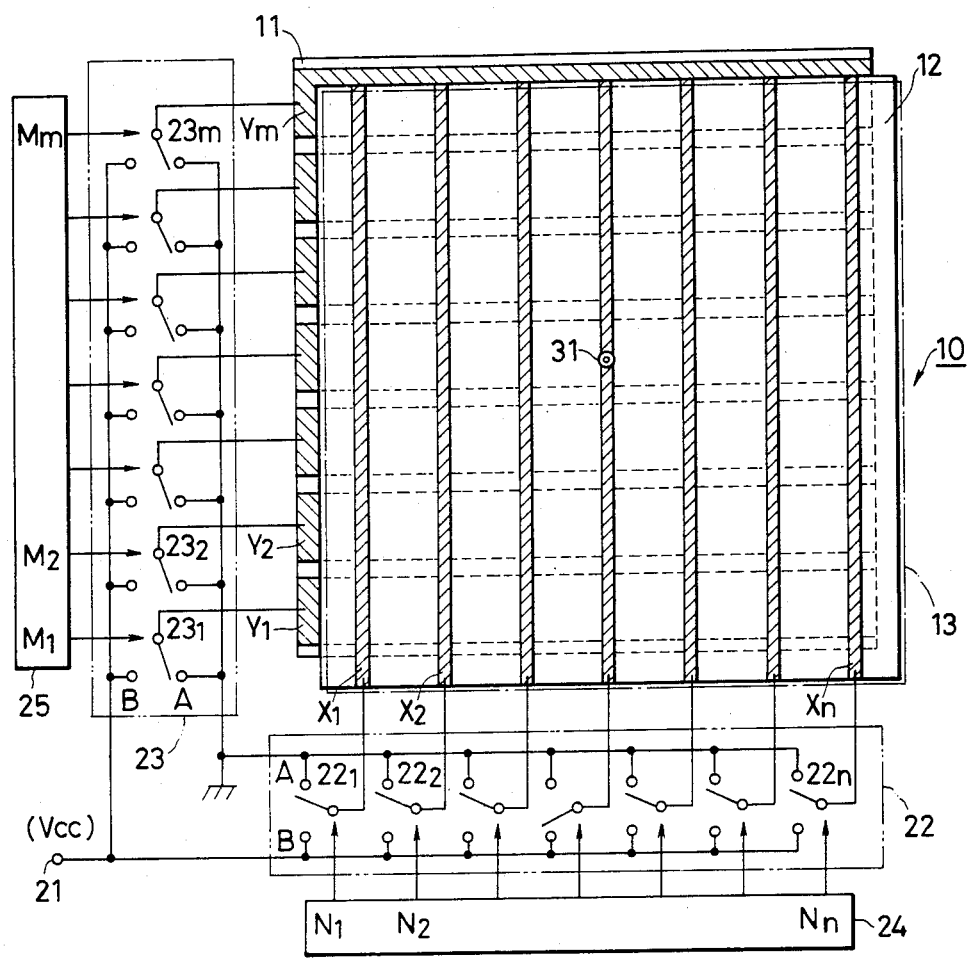
FIG. 1 is a schematic diagram illustrating part of a prior art electrostatic coordinate position digitizing system.
Figure 2:
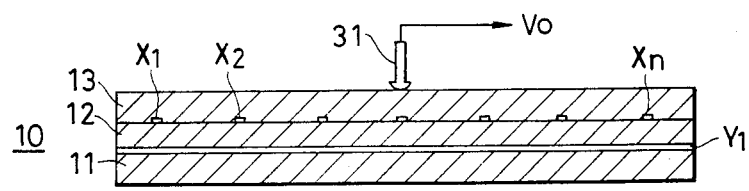
FIG. 2 is a sectional view of the apparatus shown in FIG. 1.

The coordinate position digitizing system of this embodiment is organized to include a position determining plate 10, switch circuits 22 and 23 forming a driving circuit section, and shift registers 24 and 25, which are similar to those shown in FIGS. 1 and 2. Further, in order to drive the shift registers 24 and 25 to supply a voltage to strip conductors X1, X2 . . . Xn and Y1, Y2 . . . Ym of the position determining plate 10, and are provided a clock pulse generating circuit 41, a dividing circuit 42 and a signal producing circuit 43.

Figure 5:
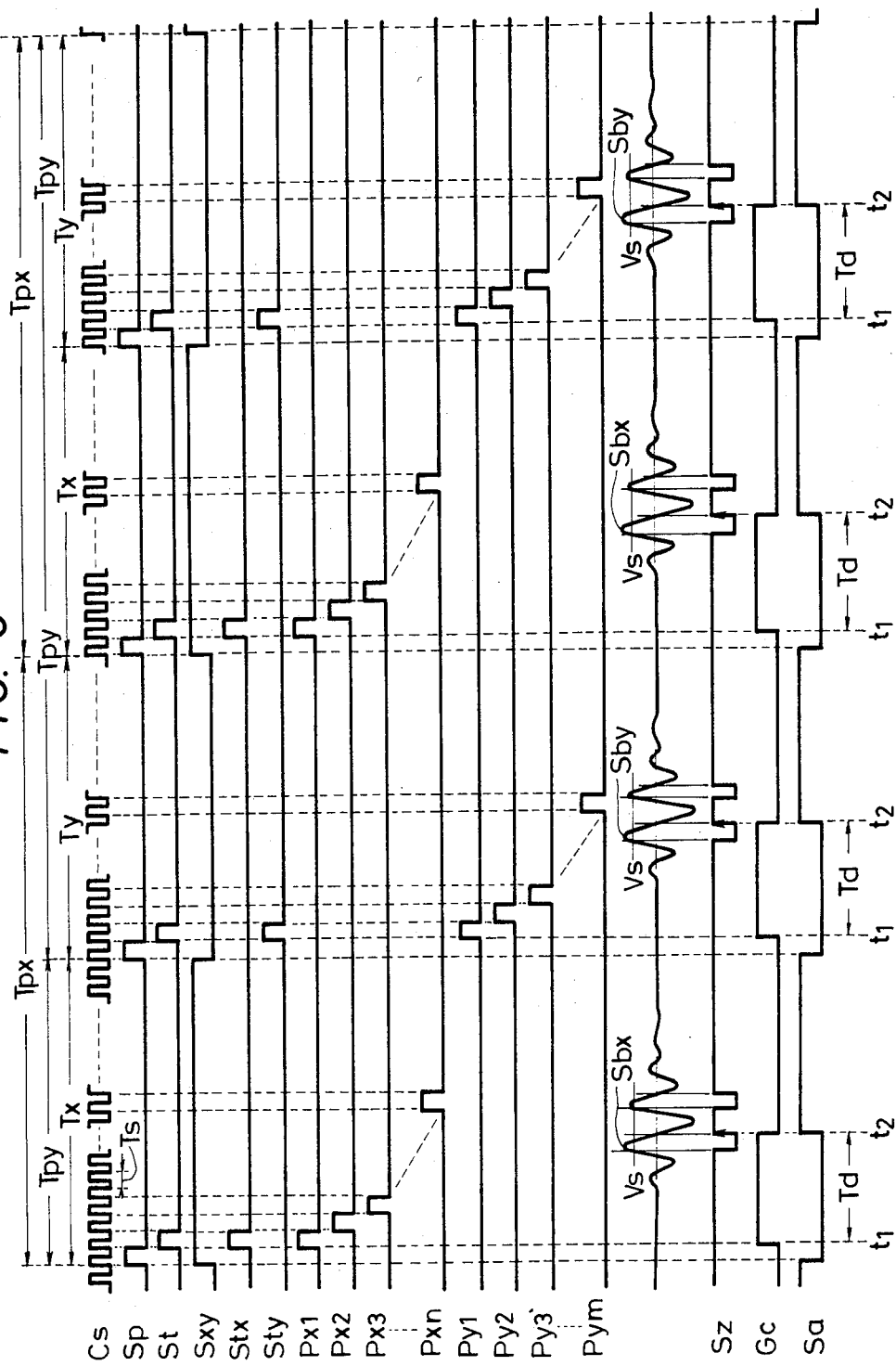
FIG. 5 is an illustration of a plurality of wave forms which serve to explain operation of the embodiment of FIG. 4.

Reference clock pulses Co which have a pulse repetition rate of, for example, 2400 KHz, are derived from the clock pulse generating circuit 41 (FIG. 4) and supplied to a dividing circuit 42 in order to produce clock pulses Cs of, for example, 60 KHz, as shown in FIG. 5. The clock pulses Cs are supplied to the signal producing circuit 43 which provides output signals Sp, St, Sxy, Stx and Sty. The detection starting signal Sp has a pulse repetition rate corresponding to the unit detecting period Tx, for detecting a position in the X direction, and for detecting a position in the Y direction, alternately. The pulse width of the signal Sp has a width corresponding to one cycle of the clock pulses Cs. The drive starting signal St is delayed in time corresponding to one cycle of the clock pulses Cs from the detection starting signal Sp. The detecting period discriminating signal Sxy has high or low values alternately for cycles of the detection starting signal Sp. The signal Stx consists of a rising pulse coinciding with the drive starting signal St, within the period Tx, for which the detecting period discriminating signal Sxy takes a higher level. The signal Sty has a rising pulse coinciding with that taken by the drive starting signal St within the period Tx for which the detecting period discriminating signal takes a lower level.

The clock pulses Cs are supplied as shift pulses to the shift register 24, while the signal Stx is supplied as a start pulse to the shift register 24, so that the pulse signals Px1, Px2 . . . Pxn each have a pulse width corresponding to one cycle of the clock pulses Cs, as shown in FIG. 5. Successive pulses are provided at the output terminals N1, N2 . . . Nn of the shift register 24 for each short period Ts corresponding to one cycle of the clock pulses Cs within the driving period from the front edge of the signal Stx (within each period Tx) for a period of n cycles of the clock pulses Cs. The pulse signals Px1, Px2 . . . Pxn are supplied to the switches $22_1$, $22_2$ . . . $22n$ of the switch circuit 22, causing the switches to toggle to connect to terminal B instead of terminal A for each short time period Ts. This allows the voltage Vcc to be supplied successively from the voltage supply terminal 21 to the strip conductors X1, X2 . . . Xn for each short period Ts.

Likewise, the clock pulses Cs are supplied as shift pulses to the shift register 25, while the signal Sty is supplied as a start pulse to the shift register 25, so that output pulse signals Py1, Py2 . . . Pym are successively provided at the output terminals M1, M2 . . . Mm of the shift register 25 for each short period Ts corresponding to one cycle of the clock pulses Cs within the driving period, starting with the front edge of the signal Sty up through end cycles of the clock pulse Cs. The pulse signals Py1, Py2 . . . Pym are supplied to the switches $23_1$, $23_2$ . . . $23m$ of the switch circuit 23, causing these switches to be successively toggled to engage terminal B instead of terminal A for each short period Ts, allowing the voltage Vcc to be successively applied from the voltage supply terminal 21 to the strip conductors Y1, Y2 . . . Ym for each short period Ts.

A voltage detecting unit 30, constituting a stylus for drawing a diagram on the position determining plate 10, includes a detecting electrode 31 which is placed on the position determining plate 10. A grounded shield case 33 surrounds the detecting electrode 31 with the latter projecting outwardly through an opening in the grounded shield case 33. The detecting electrode 31 is also connected to ground through a bypass capacitor 32 within the shield case 33. A field effect transistor 34 within the shield case 33 has its gate electrode connected to the detecting electrode 31, and resistors 35 and 35a are connected between the gate of the field effect transistor 34 and ground, and between the source terminal of the transistor 34 and ground. Thus, in each period Tx, as the electrostatic capacitance between one of the strip conductors X1, X2 . . . Xn, supplied with the voltage Vcc and the detecting electrode 31, varies successively for each short period Ts, the voltage Vo which is the detection output provided at the detecting electrode 31 also varies in level and takes a maximum value when the voltage Vcc has been supplied to the strip conductor X1, X2 . . . Xn closest to the position of the electrode 31. Similarly, in each period Ty the voltage of the detection electrode 31 also varies in level and takes a maximum voltage when the voltage Vcc has been supplied to the strip conductor Y1, Y2 . . . Ym closest to the position of the electrode 31.

The voltage Vo which is the detection output provided at the detecting electrode 31 is supplied to a tuning amplifier circuit 51 through the field effect transistor 34, from which signals of a predetermined frequency having large peak values, spaced apart in time, are provided as Sbx and Sby during each period Tx and during each period Ty, respectively. The signals Sbx and Sby, are supplied to a Schmitt trigger circuit 52 which provides an output signal Sz (FIG. 5) which falls from a high to a low level at the instant when the signals Sbx and Sby cross and exceed a predetermined positive level Vs, and then rises from the lower to the higher level at the instant at which the signals Sbx and Sby cross ground potential from positive toward negative.

The drive starting signal St derived from the signal producing circuit 43 is supplied to the setting terminal S of an RS flip-flop 53, while the signal Sz derived from the Schmitt trigger 52 is supplied to the reset terminal R of the RS flip-flop 53. The output of the flip-flop 53 produces a signal Gc which rises at the start of the driving period within the period Tx or Ty and then falls at the instant at which the signal Sbx or Sby initially crosses over the ground potential from positive toward negative, after exceeding the Vs level. The clock pulses Co produced from the clock pulse generating circuit 41, and the signal Gc produced by the RS flip-flop circuit 53 are supplied to an AND gate 55, which produces an output which extracts the clock pulses Co for a period during which the signal Gc is high, namely, for the period Td from the instant T1 to the instant T2 (FIG. 5).

The detection starting signal Sp obtained from the signal generating circuit 43 is supplied to the clear terminal CLR of a counter 54, to clear the latter at the beginning of the period Tx or Ty. Subsequently, when the signal Gc takes a high level, the clock pulses are supplied from the AND gate 55 to the clock terminal CK of the counter 54, to increment the counter. Thus the time from the instant T1 to the instant T2 is manifested by the state of the counter 54, corresponding to the distance of the detecting electrode 31 from the first strip conductor in the X or Y direction.

For the period from the instant T2, in which the signal Gc produced by the flip-flop 53 falls, up until the front edge of the detection starting signal Sp, the counter 54 retains its state corresponding to the position of the detecting electrode 31 on the position determining plate 10 in the X direction. In addition, the counter 54 also retains the output data for the position of the detecting electrode 31 in the Y direction until the onset of the next Y position determining period. Then the X and Y data from the counter 54 is supplied to the data processing section 57. The signal Sz from the Schmitt trigger circuit 52 is supplied to the setting terminal S of an RS flip-flop 56, and the detection starting signal Sp is supplied to its reset terminal R. The flip-flop 56 produces an output signal Sa which has a high level during the period in which the output data from the counter 54 corresponds to the length of the period Td. The signal Sa, as well as the signal Sxy, are supplied to the data processing section 57, from which a positional detection output representing the position of the detecting electrode 31 on the position determining plate 10 in the X and Y directions is derived.

Data corresponding to successive positions of the detecting electrode 31 on the position determining plate 10 are supplied successively to the data processing section 57 in the manner described above. The X and Y positions are supplied continuously, and alternately.

The speed of movement of the voltage detecting means 30, relative to the position determining plate 10 is limited. For example, when the voltage detecting means 30 is moved to draw a diagram on the plate 10, the speed is limited to about 30 cm per second. The unit detecting periods Tx and Ty are selected to have a time length sufficient so that each positional detection does not influence the following detection. That is, the time length is sufficient to avoid a ringing component induced in the signal Sbx or Sby from the tuning amplifier 51 as a result of a previous operating cycle. The detecting periods are set at a sufficiently rapid rate, however, so as to enhance the sampling rate in the detection of position. Typically, the periods are set at 5 milliseconds so that successive X positions are produced each 10 milliseconds, and successive Y positions are also produced each 10 milliseconds.

With the cyclical detection period of 10 milliseconds, and a maximum speed of movement of 30 cm per second, the maximum moving distance of the voltage detecting means on the position determining plate 10 within the period of detection is 3 mm.

The data processing section 57, receives the X and Y data derived from the counter 54 representing the position of the voltage detecting means 30 on the position determining plate 10 in the X and Y directions. The data processing section 57 incorporates a microprocessor 60 and memory or storage devices Qx1, Qy1, Qx2, and Qy2.

During the period in which the signal Sa has its high level, the X and Y data are stored, successively, as X and Y coordinate data in the memories Qx1, Qy1, Qx2 and Qy2 on the basis of the detecting period discriminating signal Sxy, so that the X and Y coordinate data can be independently judged.

Figure 6:
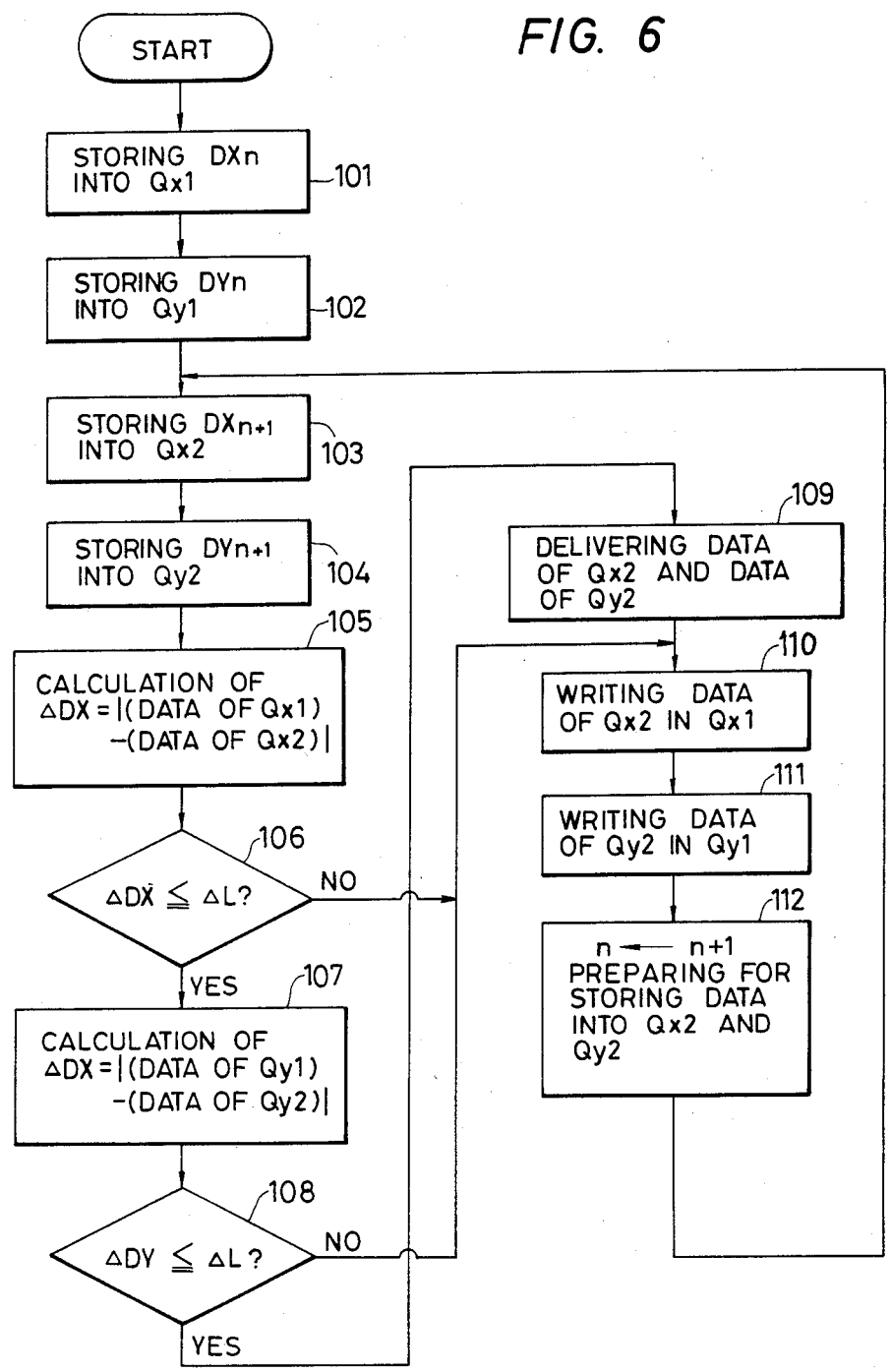
FIG. 6 is a flow chart relating to a processing program for a microprocessor incorporated in the data processing section of the embodiment illustrated in FIG. 4.

Referring to FIG. 6, a flow chart indicating the order of steps performed within the data processing section 57 is illustrated. The units and blocks of FIG. 6 may either describe steps accomplished by the data processing operations of a conventional stored program computer, or physical units such as comparitors, counters, etc. which may be interconnected to accomplish the desired functions to form a special purpose device.

When the sequence illustrated in FIG. 6 receives control, unit 101 stores the signals corresponding to the first X position in storage location Qx1, after which unit 102 stores the next occurring data corresponding to the Y position in storage location Qy1. After this, unit 103 stores the data representing the next successive X position in storage unit Qx2, and then unit 104 stores the next occuring Y position in storage unit Qy2. Thus data for successive X and Y points are all contained in storage at this time. Then the unit 105 calculates the difference between the data stored in storage locations Qx1 and Qx2. Unit 106 determines whether such difference is smaller or equal than a predetermined quantity ΔL. If so, control passes to unit 107, which calculates the difference between the data stored in storage locations Qy1 and Qy2. Then unit 108 determines whether this difference is less than a predetermined amount ΔL. If so, 109 receives control which makes the data stored at Qx2 and Qx1 available as a confirmed indication of the position of a voltage detecting unit 30 on the position determining plate. After this, unit 110 receives control which transfers the data stored at storage location Qx2 into storage location Qx1, and then unit 111 transfers the data stored at storage location Qy2 into storage location Qy1. Then unit 112 receives control to define the next storage locations, preparatory to storing newly received data into storage locations Qx2 and Qy2. Then control passes to unit 103, and the entire sequence of units 103–112 is repeated.

If either unit 106 or 108 determines that the difference between the two successive X or Y positions is more than a predetermined amount, the unit 109 is skipped, and control is passed directly to the unit 110. In this way, it is assured that the unit 109 is not allowed to make confirmed position data available unless the sequential positions indicated by the X and Y data are within the expected range. Any received data which falls outside the expected range is perceived as a noise pulse, and ignored by skipping the operation of the unit 109.

Figure 7:
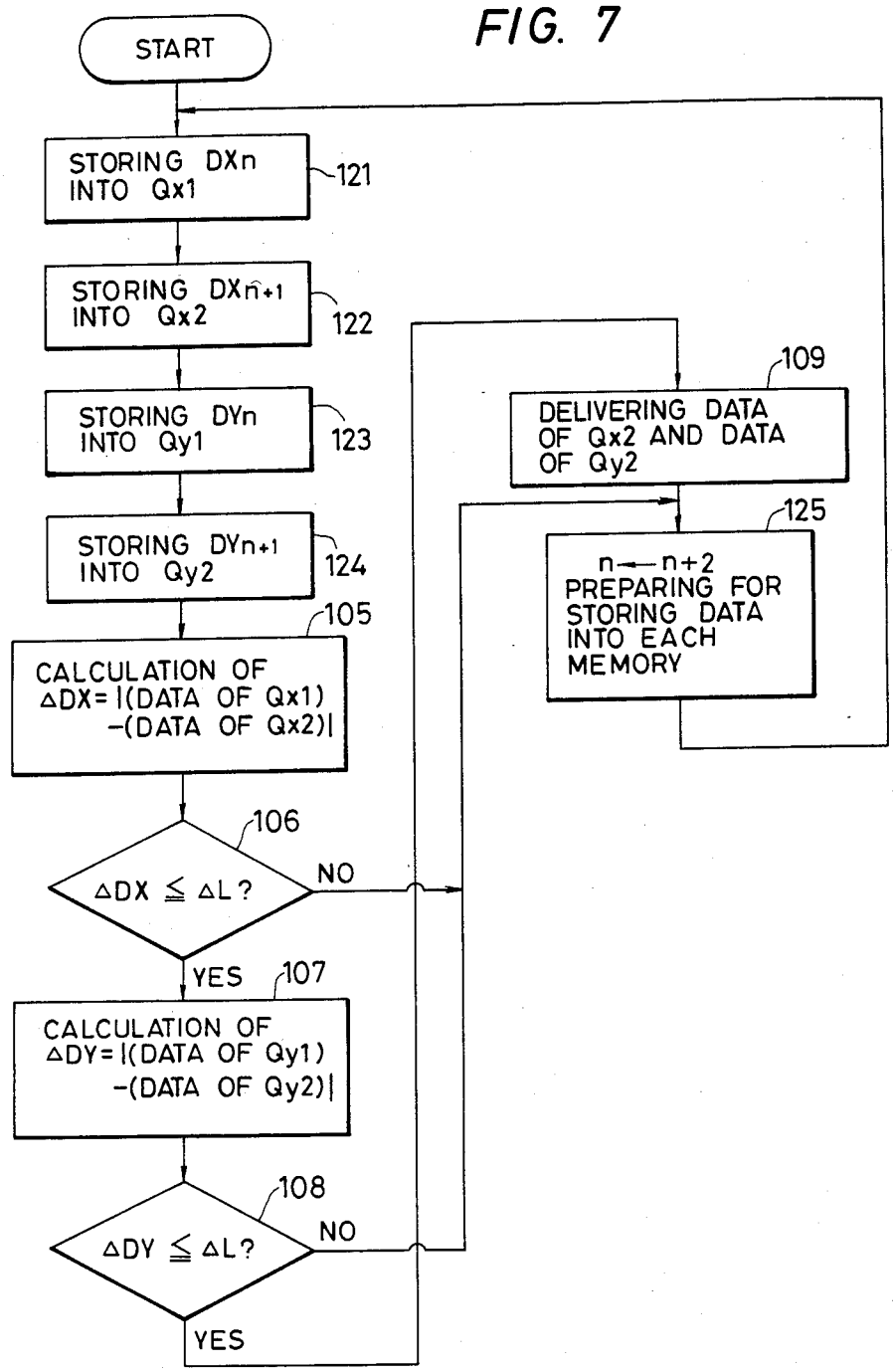
FIG. 7 is a flow chart for a processing program of a microprocessor provided in the data processing section in another embodiment of the present invention.
Figure 8A:
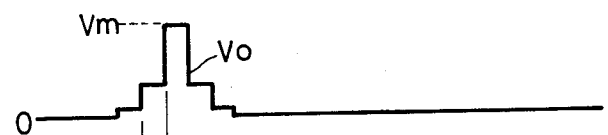
FIGS. 8A–8C are a plurality of wave forms which explain operation of the voltage detecting portion of the apparatus.
Figure 8B:
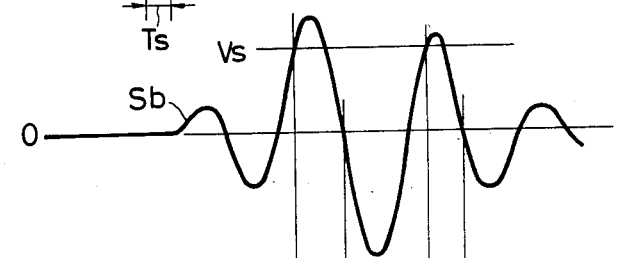
Figure 8C:
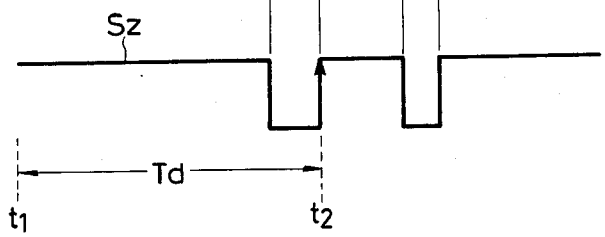

FIG. 7 illustrates an alternative sequence which may be used. In the arrangement of FIG. 7, unit 121 receives control at the start, which stores data corresponding to the X position in storage location Qx1, after which unit 122 stores the next successive data concerning the X position in storage unit Qx2. After this, units 123 and 124 store successive data corresponding to successive Y positions in storage locations Qy1 and Qy2. Then unit 105 calculates the difference in the data stored at locations Qx1 and Qx2, after which unit 106 determines if such difference is equal to or below a predetermined level ΔL. If yes, unit 107 performs the same calculation for the data stored at locations Qy1 and Qy2, and unit 108 determines whether this calculated difference is equal to or less than a predetermined amount ΔL. If so, unit 109 makes the data stored in Qx2 and Qy2 available as a confirmed position of the voltage detecting device. Then unit 125 adjusts the address register for the storage locations preparatory to storing new data in the storage locations Qx1–Qy2.

In the arrangement of FIG. 7, two X positions are sampled, without the time delay of sampling an intervening Y position, and two successive Y positions are also sampled without the time delay of an intervening X position. This allows greater discrimination of noise pulses, since the predetermined level which is used by the devices 106 and 108 may be less than with the arrangement of FIG. 6. It is understood that with the arrangement of FIG. 7, the circuit 43 of FIG. 4 is arranged so that two successive Stx periods occur, followed by two successive Sty periods, etc. The data processing section 57 must then sample the content of the counter 54 prior to the pulse Sp which resets the counter 54. This is readily accomplished however because the signal Sa is supplied to the data processing section 57, and the state of the counter 54 at the time of the pulse Sa is the value which corresponds to the time period Td.

It is apparent that by means of the present invention, an accurate indication of the position of the voltage detecting device on the position determining plate can be derived, without interference from noise pulses which naturally occur during normal operation.

It will be apparent that various additions and modifications may be made in the apparatus of the present invention without departing from the essential features of novelty thereof, which are intended to be defined and secured by the appended claims.

What is claimed is:

1. A coordinate position digitizing system comprising:
   a position determining plate having a plurality of strip conductors disposed thereon and arranged at predetermined spaced intervals;
   a driving section for connecting a voltage supply to successive ones of said plurality of strip conductors each for a predetermined short period;
   voltage detecting means for producing an output signal corresponding to the position of one of said strip conductors when said voltage detection means is placed adjacent to said position determining plate at a location which is near said strip conductor;
   signal detecting means for detecting a signal component of a predetermined frequency from said output;
   a data producing section adapted to generate data corresponding to a time period beginning with a instant at which said voltage is supplied to one of said plurality of strip conductors and ending at an instant at which the level of the output signal of said signal detecting means reaches a predetermined level; and
   a data processing section including data intake means for successively taking in the data from said data producing section corresponding to successive positions of said voltage detection means,
   coordinate difference calculating means for determining the absolute value of the difference between two successive values taken in by said data intake means,
   and coordinate data selecting means for permitting coordinate data to be confirmed as coordinate data for the position of said voltage detection means on said position determining plate when said absolute value is less than a predetermined reference value, corresponding to the maximum distance which said voltage detecting means can be moved during successive position determining periods, said data processing section being adapted to deliver a positional output in accordance with the coordinate data which is confirmed in said coordinate data selecting means.

2. Apparatus according to claim 1, wherein said data producing section incorporates means for generating data corresponding to a time period beginning with said reference instant, and ending with a later instant at which said output signal crosses over a predetermined level, after first having crossed over a different predetermined level.

3. Apparatus according to claim 1, including a second plurality of strip conductors disposed on said plate transverse to the first said conductors, said driving section connecting a voltage supply to the strip conductors of said second plurality during at least one period following said connection of the first said conductors, whereby said voltage detecting means produces an output corresponding to its position relative to said second plurality, and said data processing section delivers a positional output in accordance with the said position relative to said second plurality when successive ones of said positions are less than a predetermined limit.

4. Apparatus according to claim 3, wherein said driving section makes said connections alternately to the first and second said plurality of strips conductors.

5. Apparatus according to claim 3, wherein said driving section makes connections to the first plurality of strip conductors for two successive position determinations and then to the second plurality of strip conductors for two successive position determinations.

6. Apparatus according to claim 3, wherein said coordinate data selecting means confirms coordinate data only after coordinate data for both of said first and second pluralities of strip conductors has been confirmed.

* * * * *